No. 629,740. Patented July 25, 1899.
C. P. BROWN.
HEATER FOR THAWING FROZEN EARTH, &c.
(Application filed Mar. 10, 1898.)
(No Model.)
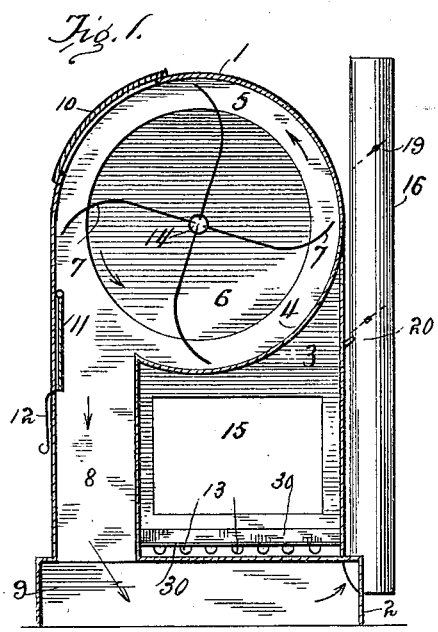
WITNESSES
Chas. K. Davies.
J. Barteu
INVENTOR
C. P. Brown
By W. H. Bartlett
Attorney

UNITED STATES PATENT OFFICE.

CHARLES PORTER BROWN, OF OMAHA, NEBRASKA.

HEATER FOR THAWING FROZEN EARTH, &c.

SPECIFICATION forming part of Letters Patent No. 629,740, dated July 25, 1899.

Application filed March 10, 1898. Serial No. 673,396. (No model.)

*To all whom it may concern:*

Be it known that I, CHARLES PORTER BROWN, a citizen of the United States, residing at Omaha, in the county of Douglas and State of Nebraska, have invented a new and useful Improvement in Appliances for Thawing Frozen Earth in Mining Operations and Cooking Attachments Thereto, of which the following is a specification.

My invention relates to improvements in appliances for the facilitation of mining in frozen earth, both in sinking vertical shafts and in tunneling horizontally and obliquely.

Said improvement consists in a fire-box directly connected with a revolving suction-fan for drawing the air rapidly through the fire-box and throwing it in an intensely-heated condition, together with the flames of the fire, directly against the ground which it is desired to thaw, and also of an attachment for utilizing the heat in the said fire-box when desired for cooking purposes. I attain these objects by the appliances illustrated in the accompanying drawings, in which—

Figure 1 is a vertical section showing the fan-drum and fire-box in position. Fig. 2 is an elevation, partly in section, showing hood for horizontal or oblique tunneling, and a partial section showing damper. Fig. 3 is a cross-section showing direction of air-currents and by means of dotted lines indicating the cooking apparatus. Fig. 4 is a horizontal section through fire-box and vertical duct on line 4 4, Fig. 3, also showing draft-pieces and showing plan of cooking apparatus.

Hitherto mining in the frozen earth of cold countries has generally been conducted by piling wood upon the earth to be thawed and thawing the same by means of an open fire, resulting in an enormous waste of heat and greatly hindering the progress of the work. By means of my invention I effect a great economy of heat and enable an immensely greater amount of work to be done than is possible by the ordinary method.

The machine herein described may be made of any desired height and is preferably constructed of sheet-steel, and consists of a fire-box 3, a fan-drum 4, an air-duct 8, and a hot-air chamber 9. The fuel is introduced into the fire-box through the fuel-door 25 and is supplied with fresh air through the draft-holes 13. At each end of the fans is an opening 6, communicating with the fire-box through a space 27 at the side of the fan-drum 4, as shown by arrows in Fig. 3. The fan-drum is cylindrical and is occupied by the fans 7, which are adapted to revolve with the shaft 14. Firmly attached to the end of the shaft and upon the outside of the machine is a pinion 22, which coöperates with a crank-wheel 21. These wheels are so adapted to each other in size that when the crank-wheel is turned by means of the crank 23 by hand or by any other power the fan 7 is revolved with great rapidity. When revolved in the direction indicated by the arrows in Fig. 1, the fan has the effect of throwing the air in the fan-drum down through the vertical air-duct 8 and into the air-chamber 9, causing a strong suction-draft through the draft-holes 13 under the bottom pieces 30 and up through the fuel in the fire-box 3, thence through the openings 6 into the fan-drum, and thence down through the vertical air-duct 8, hot-air chamber 9, and out through the smoke-pipe 16. The vertical edge of the fan-drum is marked 5 in the drawings and at the side of the drum forms the space 27 between the fan-drum and the body of the machine through which the air passes from the fuel-box into the fan-drum.

When it is desired to use the machine in horizontal tunneling, the hood 17 is attached to the fan-drum and the air-current thrown into it by means of the valve or damper 11, which is adapted to be thrown across the vertical air-duct 8, as shown in Fig. 2, and to tightly close the same. The top valve or damper 10 is removed and the upper horizontal duct 18 is attached to the fan-drum, and when these parts are in place the air is driven into the hot-air chamber or hood 17 and against the vertical face of the earth and out at the smoke-vent 28. This hood is adapted to be turned upon the air-duct 18 in any position so as to bring it to bear upon any portion of the mine-wall within the scope of its circular revolution.

In order to lighten the weight of the machine, the damper 10 may be fitted to close either the upper air-duct or the lower air-duct, as desired, interchangeably, in which case the damper 11 may be eliminated. The heavy wire brace 12 is used for pushing in the damper 11 to close the vertical air-duct and keep the said damper in place, as shown in Fig. 2.

The machine being made of sheet-steel and rendered as light as possible, the vertical brace 24 is necessary and is used to stiffen the side and render the coöperation of the crank-wheel and pinion more accurate and reliable. It also furnishes an attachment for the axle of the crank-wheel 21.

The cooking attachment shown in Figs. 3 and 4 consists of an ordinary tin or sheet-iron oven, such as are used in connection with gasolene or oil stoves, and is provided with holes 31, upon which cooking utensils can be placed, and is adapted to be attached to the side of the machine. When used in cooking, the damper or slide 15 is pushed out, so as to admit the hot air from the fire-box into the cooker. The smoke-pipe 16 is detached and is attached to the cooker, as shown in Fig. 3. The cooker is provided with an oven 32.

The bottom pieces 30 are designed for the two purposes of keeping the fuel away from the draft-holes 13 and directing the draft so as to produce the most perfect combustion of the fuel. The smoke-pipe 16 is provided with the dampers 19 and 20 for the economy of heat.

The whole machine is put together by appropriate bolts and rivets and as far as possible by separable joints to enable it to be easily taken down and packed in small compass. In actual practice it may be provided with a bail for the attachment of a rope or chain attached to a windlass, by which it may be hoisted above the user's head and out of his way while removing the softened earth.

The method of using the above described apparatus is obvious. The earth to be removed is so leveled or smoothed as to receive the face of the hot-air chamber 9 or the hood 17, as the case may be, and, the fire being kindled and the machine in place, the crank is turned until sufficient earth has been thawed, whereupon the machine is hoisted out of place or removed, the thawed earth excavated, and the operation repeated.

The form of apparatus shown in the above description is designed for the use of wood as a fuel; but it is obvious that any kind of fuel, as coal or oil, may be used by appropriate variations of the fire-box 3.

The whole machine may be protected from outside cold by a fireproof canvas pitched above it, like a tent.

The heat-chamber 9 is open at the bottom and rests upon the earth to be thawed. The hood 17 is also open to the mine-wall, and when either the hood 17 or the heat-chamber 9 is in use the heated air and flames contained in it are driven directly against the earth to be thawed, and thus produce the greatest possible effectiveness in operation.

It is obvious that by a proper arrangement of dampers part of the hot air from the drum may be driven through hood 17 and part through chamber 9.

I claim as my invention and desire to secure by Letters Patent—

1. A machine for thawing frozen earth comprising a casing having therein a heating-chamber with an open bottom and closed sides, and a smoke-pipe, and having therein over and next to the heating-chamber a combustion-chamber, and above the combustion-chamber a drum, a passage connecting the combustion-chamber and the drum, a passage connecting the drum with the heating-chamber, and a fan in the drum for drawing the products of combustion from the combustion-chamber and forcing them through the heating-chamber, substantially as described.

2. In a heating apparatus for thawing frozen earth, the open-bottom heating-chamber, the combustion-chamber over and separated from the heating-chamber by a close partition, the drum over the heating-chamber connecting with the combustion-chamber, a valved passage from the drum to the heating-chamber, an outlet from the drum, and a fan in the drum and means for operating the fan, substantially as described.

3. In a heating apparatus for thawing frozen earth, the open-bottom heating-chamber, the combustion-chamber over and separated from the heating-chamber by a close partition, the drum, flues connecting the ends of the drum with opposite sides of the combustion-chamber, a passage from the drum to the heating-chamber, a fan in the drum and means for operating the fan, substantially as described.

4. A machine for thawing frozen earth consisting essentially of a heating-chamber at the base, open at bottom, a combustion-chamber above said heating-chamber and without direct communication therewith, a fan-drum above and receiving the products of combustion from the combustion-chamber, a plurality of valved outlets from the fan-drum, one passage leading to the heating-chamber, and a hood adjustably connected to the fan-drum at the other valved passage, all substantially as described.

5. In a machine for thawing earth, a base-chamber open at bottom, a combustion-chamber above said base-chamber and separated by a close partition, a fan-drum above the combustion-chamber in position to receive the products thereof, a fan in the drum and means for driving it, a valved opening in said fan-drum, and a removable hood attachable to the drum at the opening and provided with exit-passages at its outer end, all combined substantially as described.

CHARLES PORTER BROWN.

Witnesses:
JAMES PHILLIPS,
E. O. FURLONG.